United States Patent [19]

Nishiyama et al.

[11] Patent Number: 4,868,777
[45] Date of Patent: Sep. 19, 1989

[54] HIGH SPEED MULTIPLIER UTILIZING SIGNED-DIGIT AND CARRY-SAVE OPERANDS

[75] Inventors: Tamotsu Nishiyama; Shigeo Kuninobu, both of Osaka; Naofumi Takagi, Kyoto, all of Japan

[73] Assignee: Matsushita Electric Industrial Co., Ltd., Osaka, Japan

[21] Appl. No.: 95,525

[22] Filed: Sep. 10, 1987

Related U.S. Application Data

[63] Continuation-in-part of Ser. No. 66,817, Jun. 25, 1987, and a continuation-in-part of Ser. No. 70,656, Jul. 7, 1987, and a continuation-in-part of Ser. No. 74,892, Jul. 17, 1987, and a continuation-in-part of Ser. No. 74,971, Jul. 17, 1987, and a continuation-in-part of Ser. No. 86,967, Aug. 18, 1987.

[30] Foreign Application Priority Data

Sep. 12, 1986 [JP] Japan .................................. 61-216591
Feb. 18, 1987 [JP] Japan .................................. 62-35042

[51] Int. Cl.$^4$ .............................................. G06F 7/49
[52] U.S. Cl. ................................... 364/754; 364/760; 341/56
[58] Field of Search .................. 364/754, 760; 341/56

[56] References Cited

U.S. PATENT DOCUMENTS 4,646,257  2/1987  Essig et al. ......................... 364/760

OTHER PUBLICATIONS

Avizienis, "Binary-Compatible Signed-Digit Arithmetic", *Proceeding-Fall Joint Computer Conference*, 1964, pp. 663–672.
A VLSI-Oriented High-Speed Divider Using Redundant Binary Representation, Takagi, et al., IECE Japan, vol. 167, D #4, pp. 450–457, 4/84.
A VLSI-Oriented High-Speed Multiplier Using Redundant Binary Adder Tree, Takagi, et al. IECE Japan, vol. J66.d, pp. 683–690, 6/84.
A New Class of Digital Division Methods, James Robertson, IRE Transactions on Electronic Computers, pp. 218–222, 9/58.
Signed–Digit Number Representations for Fast Parallel Arithmetic, Avizienis, IRE Transactions on Electronic Computers, pp. 389–400, 9/61.
A Class of Binary Divisions Yielding Minimally Represented Quotients Metz IRE Tranactions on Electronic Computers, pp. 761–764, 12/62.
Design of the Arithmetic Units of ILLIAC III, Redundancy & Higher Radix Methods, Atkins, IEEE Transacts. on Computers, vol. C-19, pp. 720–732, 8/70.
Multiple Operand Addition and Multiplication, Shanker Singh et al., IEEE Transactions on Computers, vol. C-22, No. 2, pp. 113–120.
Concise Papers, Lyon, IEEE Transactions on Communications, pp. 418–425, 4/76.
Real–Time Processing Gains Ground with Fast Digital Multiplier, Waser, et al. Electronics, pp. 93–99, 9/77.
High Speed Multiplier Using A Redundant Binary Adder tree, Harata, et al. IEEE International Conference on Computer Design, pp. 165–170, 1984.
High Speed VLSI Multiplication Algorithm With A Redundant Binary Addition Tree, Takagi et al., IEEE Transactions on Computers, vol. C-34, No. 9, pp. 1789–1795, 9/85.
Design of High Speed MOS Multiplier and Divider Using Redundant Binary Representation, Kuninobu, et al., Proceedings 8th Symposium on Computer Arithmetic, pp. 80–86, 5/87.

*Primary Examiner*—David H. Malzahn
*Attorney, Agent, or Firm*—Amster, Rothstein & Ebenstein

[57] ABSTRACT

An arithmetic processor cable of performing successive multiplication operations at high speeds is described in which the resultant product, internally represented as a carry-save or signed-digit expression, may be directly input in that form as the multiplier for the next successive multiplication operation. Additionally, a multiplier recoder circuit is provided which recodes the binary multiplier, in the form of a carry-save or signed-digit expression into a radix 4 signed-digit number, in order to further increase the operating speed.

12 Claims, 9 Drawing Sheets

Fig. 3.

| $(2j+1)$-th order position $x_{2j+1}+y_{2j+1}$ | $2j$-th order position $x_{2j}+y_{2j}$ | $(2j-1)$-th order position $x_{2j-1}+y_{2j-1}$ | Intermediate carry $c_j$ | Intermediate result $s_j$ |
|---|---|---|---|---|
| 0 | 0 | -- | 0 | 0 |
| 0 | 1 | 0 or 1 | 0 | 1 |
| 0 | 1 | 2 | 1 | -3 |
| 0 | 2 | -- | 1 | -2 |
| 1 | 0 | -- | 1 | -2 |
| 1 | 1 | -- | 1 | -1 |
| 1 | 2 | -- | 1 | 0 |
| 2 | 0 | -- | 1 | 0 |
| 2 | 1 | 0 or 1 | 1 | 1 |
| 2 | 1 | 2 | 2 | -3 |
| 2 | 2 | -- | 2 | -2 |

Fig. 7.

| Intermediate carry $C_j$ (if $x_{2j-1} = -1$) | 2j-th order position of multiplier $x_{2j}$ | (2j+1)-th order position of multiplier $x_{2j+1}$ | | | |
|---|---|---|---|---|---|
| | | −1 | −1 | 0 | 1 |
| −1 | | −1 | −1 | 0 | 1 |
| 0 | | −1 | −1 | 0 | 0 |
| 1 | | 0 | 0 | 0 | 1 |

Fig. 8.

| Intermediate carry $C_j$ (if $x_{2j-1} = 0, 1$) | 2j-th order position of multiplier $x_{2j}$ | (2j+1)-th order position of multiplier $x_{2j+1}$ | | | |
|---|---|---|---|---|---|
| | | −1 | −1 | 0 | 1 |
| −1 | | −1 | −1 | 0 | 1 |
| 0 | | 0 | 0 | 0 | 0 |
| 1 | | 0 | 0 | 0 | 1 |

Fig. 9.

| Intermediate result $S_j$ (if $x_{2j-1} = -1$) | (2j+1)-th order position of multiplier $x_{2j+1}$ | | |
|---|---|---|---|
| 2j-th order position of multiplier $x_{2j}$ | $-1$ | $0$ | $1$ |
| $-1$ | $1$ | $-1$ | $1$ |
| $0$ | $2$ | $0$ | $2$ |
| $1$ | $-1$ | $1$ | $-1$ |

Fig. 10.

| Intermediate result $S_j$ (if $x_{2j-1} = 0, 1$) | (2j+1)-th order position of multiplier $x_{2j+1}$ | | |
|---|---|---|---|
| 2j-th order position of multiplier $x_{2j}$ | $-1$ | $0$ | $1$ |
| $-1$ | $1$ | $-1$ | $1$ |
| $0$ | $-2$ | $0$ | $-2$ |
| $1$ | $-1$ | $1$ | $-1$ |

4,868,777

HIGH SPEED MULTIPLIER UTILIZING SIGNED-DIGIT AND CARRY-SAVE OPERANDS

This is a continuation-in-part of application Ser. No. 066,817 filed June 25, 1987 entitled "Arithmetic Processor Using Redundant Signed Digit Arithmetic", application Ser. No. 070,565 filed July 7, 1987 entitled "Arithmetic Processor and Divider Using Redundant Signed Digit Arithmetic", application Ser. No. 074,892 filed July 17, 1987 entitled "Arithmetic Processor and Divider Using Redundant Signed Digit Arithmetic", application Ser. No. 074,971 filed July 17, 1987 entitled "Arithmetic Processor and Multiplier Using Redundant Signed Digit Arithmetic", and application Ser. No. 086,967 filed Aug. 18, 1987 entitled "Adder Circuitry Utilizing Redundant Signed Digit Operands", the disclosures of which are incorporated herein by reference.

BACKGROUND OF THE INVENTION

This invention relates to an arithmetic processor, and more particularly to an arithmetic processor particularly suitable for repeated high speed execution of arithmetic operations.

A conventional high speed multiplier has been described, for example, in pages 76 to 90 of Nikkei Electronics, May 29, 1978. In a binary array multiplier or a multiplier using a Wallace tree, partial products are summed up by using a carry save adder to obtain a product represented in a carry save expression (two binary numbers), and the product is converted into an ordinary binary number by using a carry look ahead adder or the like. In these multipliers, the amount of hardware is decreased and the computation speed is increased by reducing the number of partial products by one-half by converting the multipliers into the radix 4 signed-digit numbers consisting of elements of $-2, -1, 0, 1, 2$ by the 2-bit Booth method.

A high speed binary multiplier using a redundant binary addition tree is discussed in pages 683 to 690 of *Trans. of IECE Japan*, Vol. J66-D, No. 6 (1983). In this multiplier, a redundant binary expression consisting of elements $-1, 0, 1$ (that is, a signed digit expression) is used in the arithmetic operation. In n-bit multiplication, n partial products are regarded as redundant binary numbers, and are added, two by two, in the redundant binary number system in a twin tree form, and the product determined by converting the redundant binary expression into an ordinary binary expression. In the redundant binary number system, addition of two numbers can be done in a constant time, regardless of the number of digits involved in the arithmetic operation, without carry propagation. Therefore, in the multiplier using the redundant binary addition tree, an n-bit multiplication can be accomplished at a high speed in computation time $O(\log n)$. The computation speed is as fast as that of the high speed multiplier using the Wallace tree, being considerably higher than that of the conventional array multiplier. In addition, the circuit structure is as regular as that of the array multiplier, and the layout is simpler than the layout of the multiplier using the Wallace tree.

The method of realizing division and extraction of the square roots using an arithmetic processor possessing a redundant binary multiplier is discussed in pages 45 to 50 of *Report of IECE Japan*, AL85-90 (March 1986). In this method, it is necessary to multiply redundant binary members mutually in the multiplier. When the multiplier is configured to multiply redundant binary numbers, the quantity of hardware increases, compared with the multiplier for mutual binary numbers.

SUMMARY OF THE INVENTION

It is a primary object of this invention to provide an arithmetic processor capable of performing repeated arithmetic operations at high speed, by receiving, as the input to the arithmetic operation for the next stage, the internal expression such as carry save expression and redundant binary expression which are outputs of the arithmetic operation of multiplication, etc.

In particular, in the multiplier or arithmetic processor capable of both multiplication and addition, this invention provides an arithmetic processor capable of recoding the output result as multiplier, directly in the carry save expression or signed digit expression which are outputs of addition of the arithmetic operation.

The above objects are achieved by: (1) an arithmetic processor for determining the result of arithmetic operations, such as multiplication, by using plural numbers (such as carry save expression) or a signed digit expression (such as a redundant binary expression), comprising a plurality of memory means for storing these plural numbers or signed digit numbers and a means of generating inputs to the arithmetic operation directly from the plural numbers or signed digit numbers stored in said plurality of memory means, wherein the plural numbers or signed digit numbers which are outputs of the arithmetic operation are held in said plurality of memory means; or by (2) a multiplier recoder circuit for feeding the plural numbers or signed digit numbers as multipliers in multiplication, by the steps of composing a set of the plural numbers or signed digit numbers corresponding to a certain number of consecutive digits of the multiplier, expressing the multiplier by a group of such sets determining the intermediate result for each set, determining the intermediate carry for each set, and generating the digits of the multiplier recoded from said intermediate result for each set and said intermediate carry from the set at the next-lower-order position of the set.

Those and other objects and features of the invention will be more fully explained below with reference to the following drawings.

BRIEF DESCRIPTION OF THE DRAWINGS

FIG. 3 is a table of the determination rule of intermediate carry and intermediate result when recoding;

FIGS. 7 and 8 are tables showing rules for determining the intermediate carry at the time of recoding;

FIGS. 9 and 10 are tables showing the rules for determining the intermediate result at the time of recoding.

DETAILED DESCRIPTION OF THE INVENTION

In the prior art, no consideration is given to the high speed operation corresponding to application of repeated multiplications, such an polynomial computations, where the result of multiplication (that is, the product) in the previous stage is used as the multiplier of multiplication for the next stage. In that operation, the product must be once converted into a binary expression from the internal expression such as the carry save expression and signed digit expression, and further converted into a radix 4 signed-digit number. Therefore, when the number of digits involved in the multiplication increases, it takes a longer time to convert from the internal expression, such as carry save expression and signed digit expression, into the binary expression. Furthermore, when the number of repetitions of multiplication increases, the computation time increases.

For example, in a multiplication using redundant binary numbers in internal addition and subtraction, by recoding the multipliers into radix 4 signed-digit numbers (quaternary numbers consisting of −2, −1, 0, 1, 2) following the 2-bit Booth method, the number of partial products is reduced to about half, and the calculation speed is increased while the quantity of hardware is decreased. However, this applies only to multiplication of binary numbers. No consideration is paid to multiplication using redundant binary numbers at least in either multiplier or multiplicand. When realizing multiplication using redundant binary numbers as combinational circuitry, if the number of digits of operation increases: (1) the operation delay time is greater as compared with multiplication of binary numbers only; (2) the gate count is very large and the circuit composition is complicated; and (3) it is hard to incorporate the arithmetic processor on one LSI chip.

Therefore, in accordance with one aspect of the invention, in multiplication, the multiplier (in the signed digit expression or the carry save expression) is divided into groups of 2 digits each, and the intermediate carry $C_i$ ($C_i$ being any one of −1, 0, 1, or 0, 1, 2) of the recoded multiplier in each group is generated, while simultaneously, the intermediate result $S_i$ ($S_i$ being any one of −2, −1, 0, 1, 2, or −3, −2, −1, 0, 1) of the recoded multiplier in each group is generated. Next, in each group, the intermediate result $S_i$ of the group and the intermediate carry $C_{i-1}$ from the next-lower group are summed, and the digit $B_i$ ($B_i$ being any one of −2, −1, 0, 1, 2) of the recoded multiplier is generated, so that the number of partial products may be reduced to half. As a result, the number of cells for addition can be decreased to about half, the calculation speed may be increased and the amount of hardware can be reduced.

Figure 1:
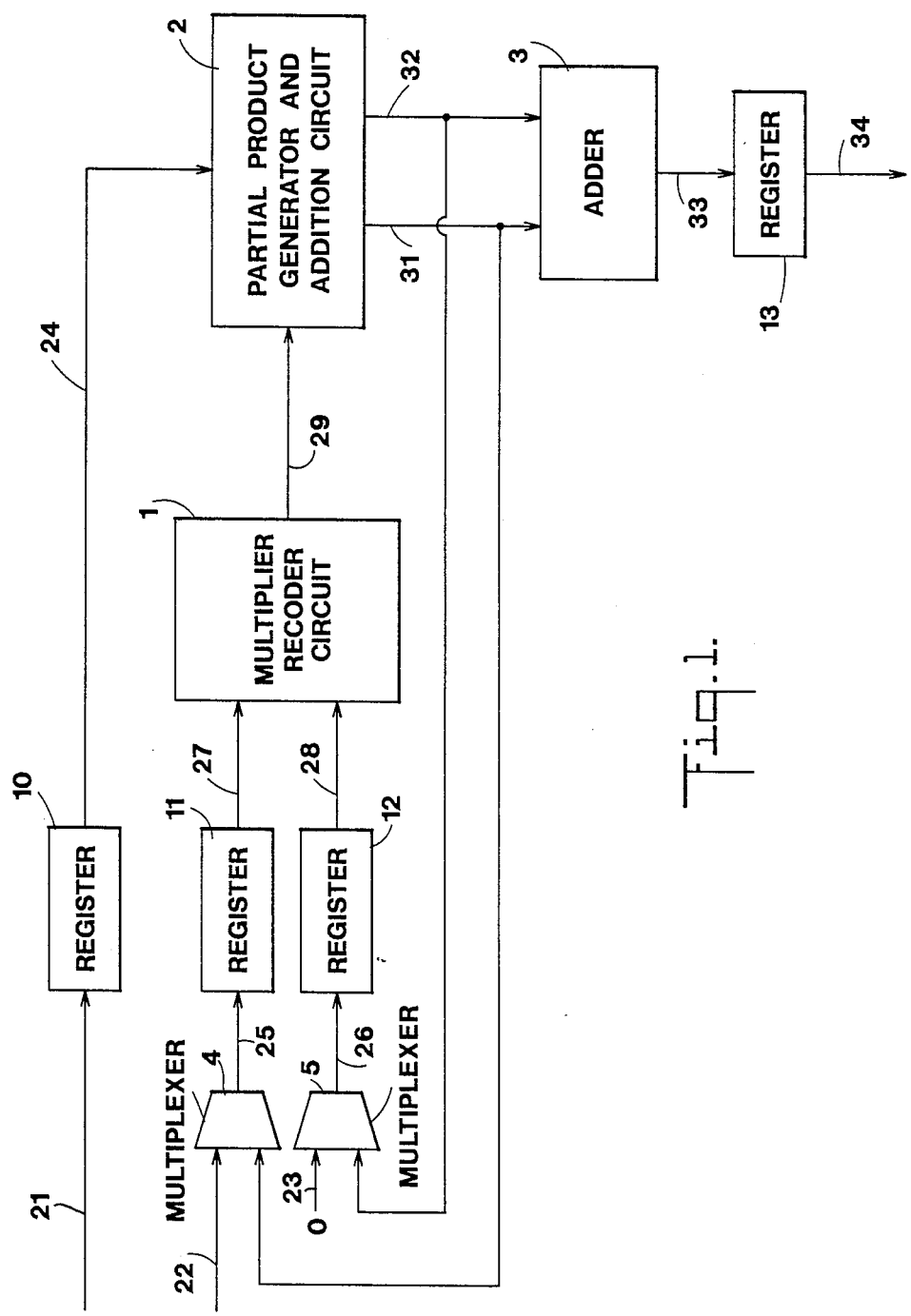
FIG. 1 is a block diagram showing one embodiment of the multiplier of this invention.

FIG. 1 is a block diagram showing an embodiment of a multiplier of this invention. In this embodiment, a carry save adder is used for addition of partial products and the multiplier has a circuit for recoding the multiplier from a carry save expression (two binary numbers) into a radix 4 signed-digit number consisting of −2, −1, 0, 1, 2.

The multiplier of FIG. 1 includes a multiplier recoder circuit 1, partial product generation and addition circuit 2, adder 3, multiplexers 4, 5, and registers 10, 11, 12 and 13. Reference numerals 21, 22, 23, 24, 25, 26, 27, 28, 31, 32, 33 and 34 represent, respectively, n-bit signals. In this embodiment, for simplicity's sake and by way of example, n is selected so as to prevent overflow of digits and a rounding process is omitted. Specifically, reference numerals 21 and 24 represent complement binary numbers denoting multiplicand, reference numeral 22 represents a multiplier, reference numeral 31 represents an intermediate result, reference numeral 32 represents a product carry number, and reference numerals 33 and 34 represent final products. Reference numeral 29 represents a radix 4 signed-digit number expressing the recoded multiplier. Reference numeral 23 represents an n-bit signal constantly representing 0. Each block will now be explained.

The partial product generator and addition circuit 2 calculates the partial product of the digit and multiplicand 24 in each digit of the recoded multiplier 29 and sums the partial products corresponding to all digits to determine the product in the carry save expression. That operation results in the product intermediate result 31 and product carry numbers 32. In the generation of the partial product, each digit of the recoded multiplier 29 doubles the multiplicand and reverses the plus and minus signs according to any value of −2, −1, 0, 1, 2. The multiplicand can be doubled by shifting each digit of the multiplicand one bit to the left, and the plus and minus signs may be reversed by finding the 2's complement of the multiplicand. Furthermore, addition of partial products may be readily implemented by a Wallace tree or an array using the carry save adder.

The adder 3 converts the product from the carry save expression (the product intermediate result 31 and product carry number 32) to an ordinary binary expression. That is, by adding the product intermediate result 31 and product carry number 32, the final product 33 in the binary expression is determined. This may be readily implemented by a carry look ahead adder which is well known in the art.

Multiplexers 4 and 5 select the multiplier of the multiplication of the next stage, selecting either the multiplier 22 from outside, or the carry save expression 31 and 32 to express the product of multiplication of the previous stage. Since multiplier 22 is usually a binary number, one input signal 23 to the multiplexer 5 is 0 for the sake of convenience. Input signals 22 and 23 to multiplexers 4, 5 may be interchanged with input signal 22 applied to multiplexer 5 and input signal 23 applied to multiplexer 4.

Registers 10, 11, 12 and 13 are n-bit memories for respectively storing binary numbers expressing the multiplicand 21, intermediate result 25, and carry number 26 in carry save expression of multiplier and final product 33. Register 10 may be omitted if the input signal to the multiplication can be synchronized by some other method.

Figure 2:
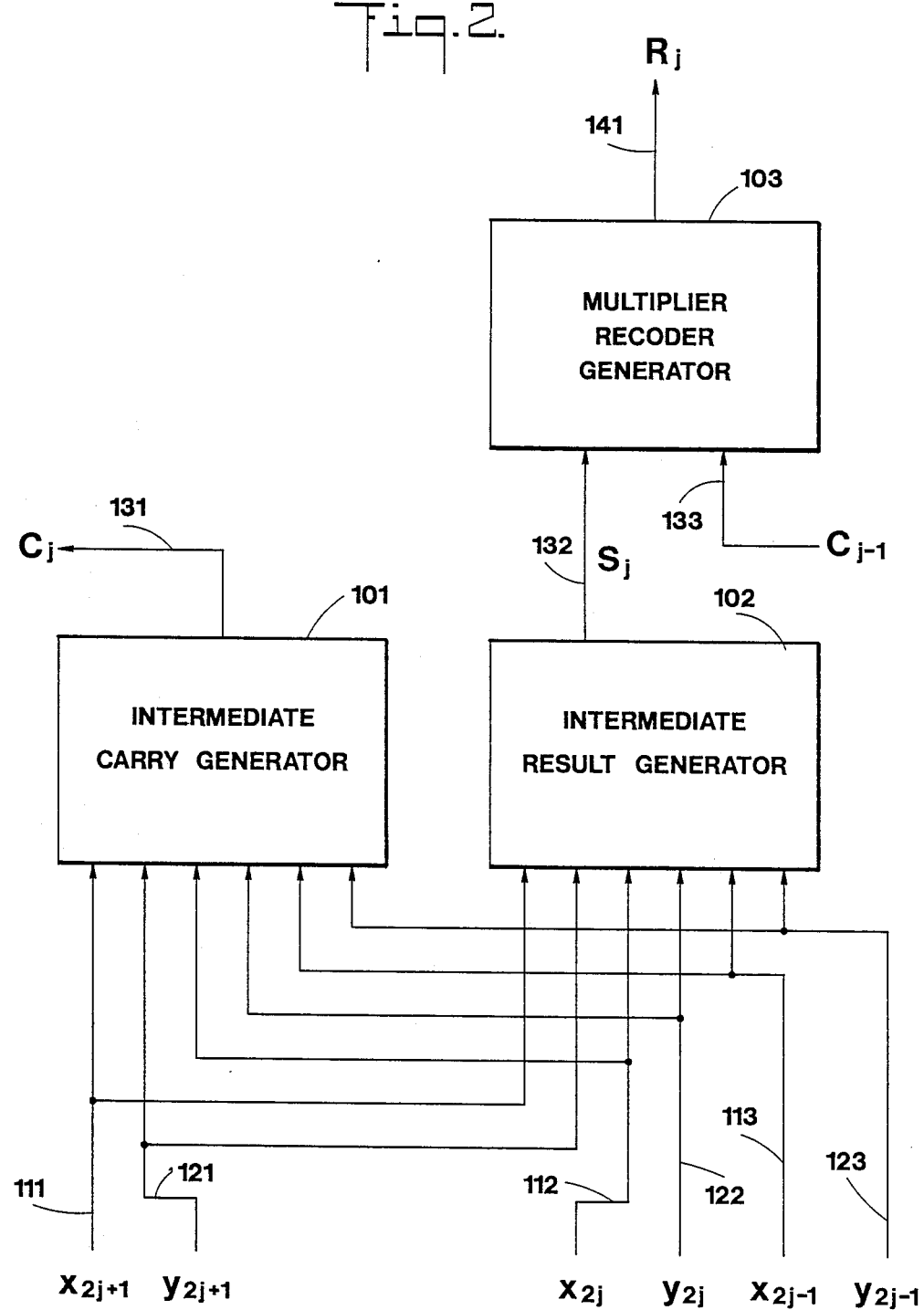
FIG. 2 is a block diagram of the multiplier recoder circuit of the multiplier of FIG. 1.

FIG. 2 is a schematic block diagram of a basic cell of the multiplier recoder circuit 1. As shown in FIG. 2, the basic cell multiplier recoder circuit 1 includes an intermediate carry generator 101, intermediate result generator 102, and recoded multiplier generator 103. Both intermediate carry generator 101 and intermediate result generator 102 receive the (2j+1)-th order position $x_{2j+1}$ 111, the 2j-th order position $x_{2j}$ 112, and the (2j−1)-th order position $x_{2j-1}$ 113 (which appear on line 27, FIG. 1), expressing the intermediate result in the multiplier carry save expression, and the (2j+1)-th order position $Y_{2j+1}$ 121, the 2j-th order position $Y_{2j}$ 122, and the (2j−1)-th order position $Y_{2j-1}$ 123 (which appears on line 28, FIG. 1), expressing the carry number in the multiplier carry save expression, and delivers intermediate carry $C_j$, 131, and intermediate result $S_j$, 132, at the j-th digit respectively. The recoded multiplier generator 103 receives the intermediate result $S_j$, 132, at the j-th digit and the intermediate carry, $C_{j-1}$, 133 from the (j−1)-th digit, and delivers the j-th digit, $R_j$, 141 of the recoded multiplier. That is, recoding is done in two steps.

More specifically, in the first step, two numerals, on signal lines 27 and 28, in the multiplier carry save expression are divided into groups of two digits each (which correspond to groups of three digits wherein the least significant digit of each 3-digit group is the same as the most significant digit of the next lower order 3-digit group), and the intermediate carry $C_j$, 131, and intermediate result $S_j$, 132, are determined from two digits of the group $x_{2j+1}$, 111, $x_{2j}$, 112, and $Y_{2j+1}$, 121, $Y_{2j}$, 122, and the higher order digits of the next lower order group $x_{2j-1}$, 113 and $Y_{2j-1}$, 123.

In the second step, the j-th digit $R_j$, 141 of the recoded multiplier is determined from the intermediate result $S_j$, 132 of the group and the intermediate carry $C_{j-1}$, 133 of the next lower group. However, $x_{2j+1}$, 111, $x_{2j}$, 112, $x_{2j-1}$, 113, $Y_{2j+1}$, 121, $Y_{2j}$, 122 and $Y_{2j-1}$, 123 are respectively one-bit signals expressed as either 0 or 1. The intermediate carries $C_j$, 131 and $C_{j-1}$, 133 are both signals expressed as either 0, 1 or 2. The intermediate result $S_j$, 132 is a signal expressed as any one of −3, −2, −1, 0, 1, and the recoded multiplier $R_j$, 141 is a signal expressed as any one of −2, −1, 0, 1, 2.

Each block in FIG. 2 will now be described in greater detail.

The intermediate carry generator 101 and intermediate result generator 102 are the circuits for generating the intermediate carry $C_j$, 131 and intermediate result $S_j$, 132, in accordance with the rules shown in FIG. 3, from the arithmetic sums $x_{2j+1} + Y_{2j+1'}$, $x_{2j} + Y_{2j'}$, and $x_{2j-1} + Y_{2j-1}$ of, respectively, the (2j+1)-th order position, the 2j-th order position, and the (2j−1)-th order position of the two numerals 27 and 28, in which + is an arithmetic operator representing addition.

The recoded multiplier generator 103 is a circuit for generating the j-th digit of the recoded multiplier by adding the intermediate result $S_j$ and the intermediate carry $C_{j-1}$ from the next-lower order position, that is, by performing an arithmetic sum $S_j + C_{j-1}$. However, the recoded multiplier $R_j$ is any one of −2, −1, 0, 1, 2. The rule in FIG. 3 is an example of determining the intermediate carry $C_j$ and intermediate result $S_j$, which is determined so that the intermediate carry $C_{j-1}$ from the lower digit is not 0 if the intermediate result $S_j$ is −3, or that the intermediate carry $C_{j-1}$ from the lower digit is not 2 if the intermediate result $S_j$ is 1.

For example, when signed digit numerals $R_j$, $C_j$, $S_j$ are expressed by 2's complement binary numerals of 3 bits, intermediate carry generator 101, intermediate result generator 102, and recoded multiplier generator 103 may be easily designed. However, since intermediate carry $C_j$ is always nonnegative, it may be expressed by a 2-bit signal omitting the sign bit.

In this embodiment, the multiplier carry save expression is divided into groups of 2 digits each, that is, the (2j+1)-th order position and the 2j-th order position. It is also possible to divide the multiplier carry save expression into two groups of two digits consisting of the 2j-th order position and the (2j−1)-th order position. The recoder circuit 1 has a fundamental circuit as shown in FIG. 2 for each one of such groups, and generates one digit for the recoded multiplier $R_j$.

Figure 4:
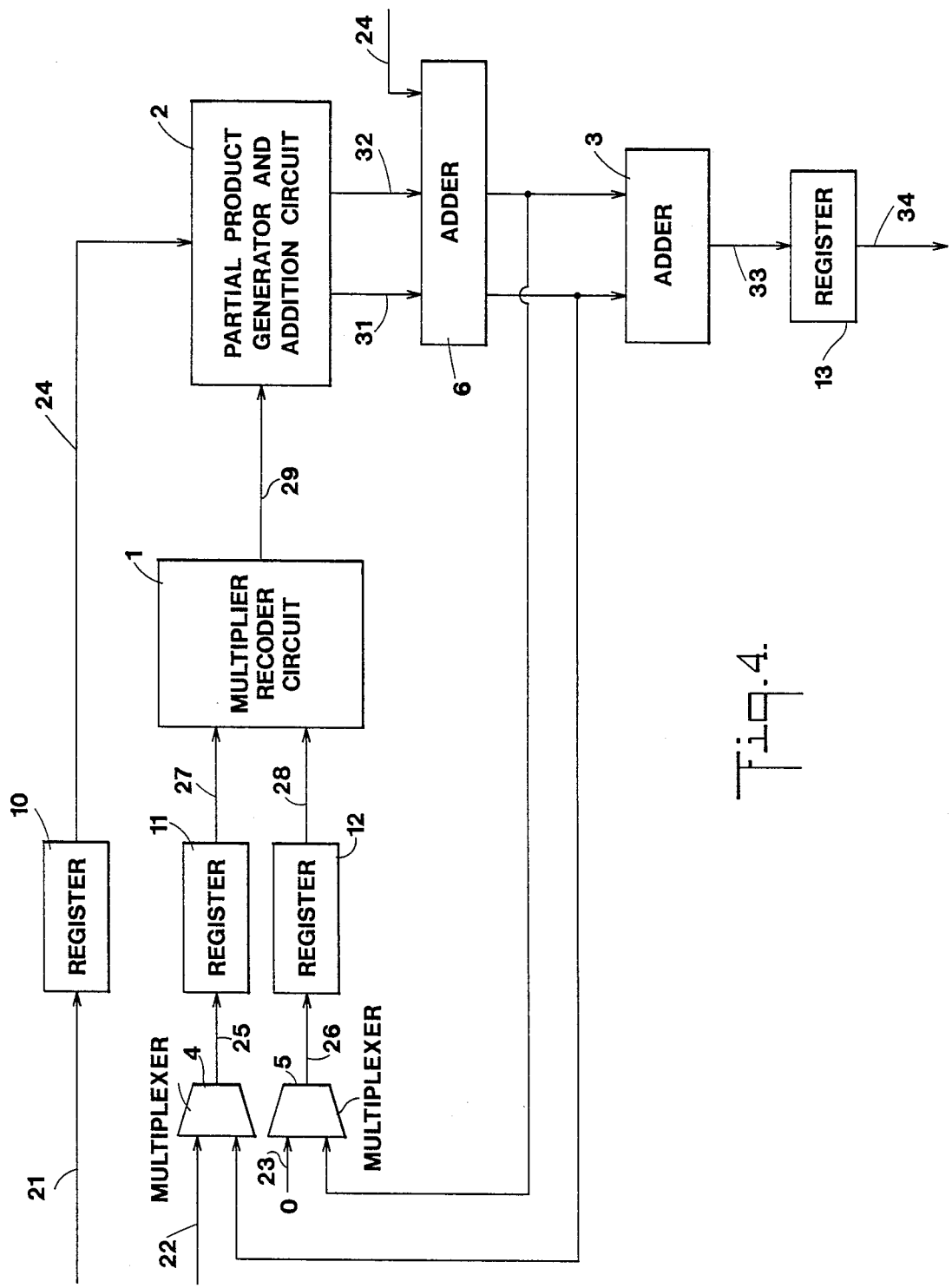
FIG. 4 is a block diagram of a multiplier-added which is a second embodiment of this invention.

In this embodiment, an arithmetic unit for performing multiplications repeatedly was explained. However, it is also possible to perform multiplications and additions repeatedly by inserting carry save adders to the product intermediate result 31 and the product carry number 32 in FIG. 1, and adding the product carry save expression and other binary numeral, and delivering the result in a carry save expression. Hence, it is possible to execute a polynomial calculation such as:

$$((((y_1 \times x_1 + a_1) \times x_2 + a_2) \times x_3 + a_3) \times x_4 + a_4)\ldots\ldots$$

at a high speed. FIG. 4 is a block diagram of a system for carrying out this function in which the like elements of FIG. 1 are indicated by the same reference numerals. In FIG. 4, block 6 is an adder such as carry save adder (CSA), and reference numeral 30 is an n-bit binary signal expressing a binary numeral which is an addend.

According to the embodiment of the invention shown in FIG. 4, as compared with a conventional multiplier using a carry save adder, conversion from the product carry save expression to an ordinary binary expression is omitted when performing repeated multiplications, so that the operation time proportional to the number of digits of arithmetic operation or proportional to its logarithm, can be shortened by every number of repetitions.

Figure 5:
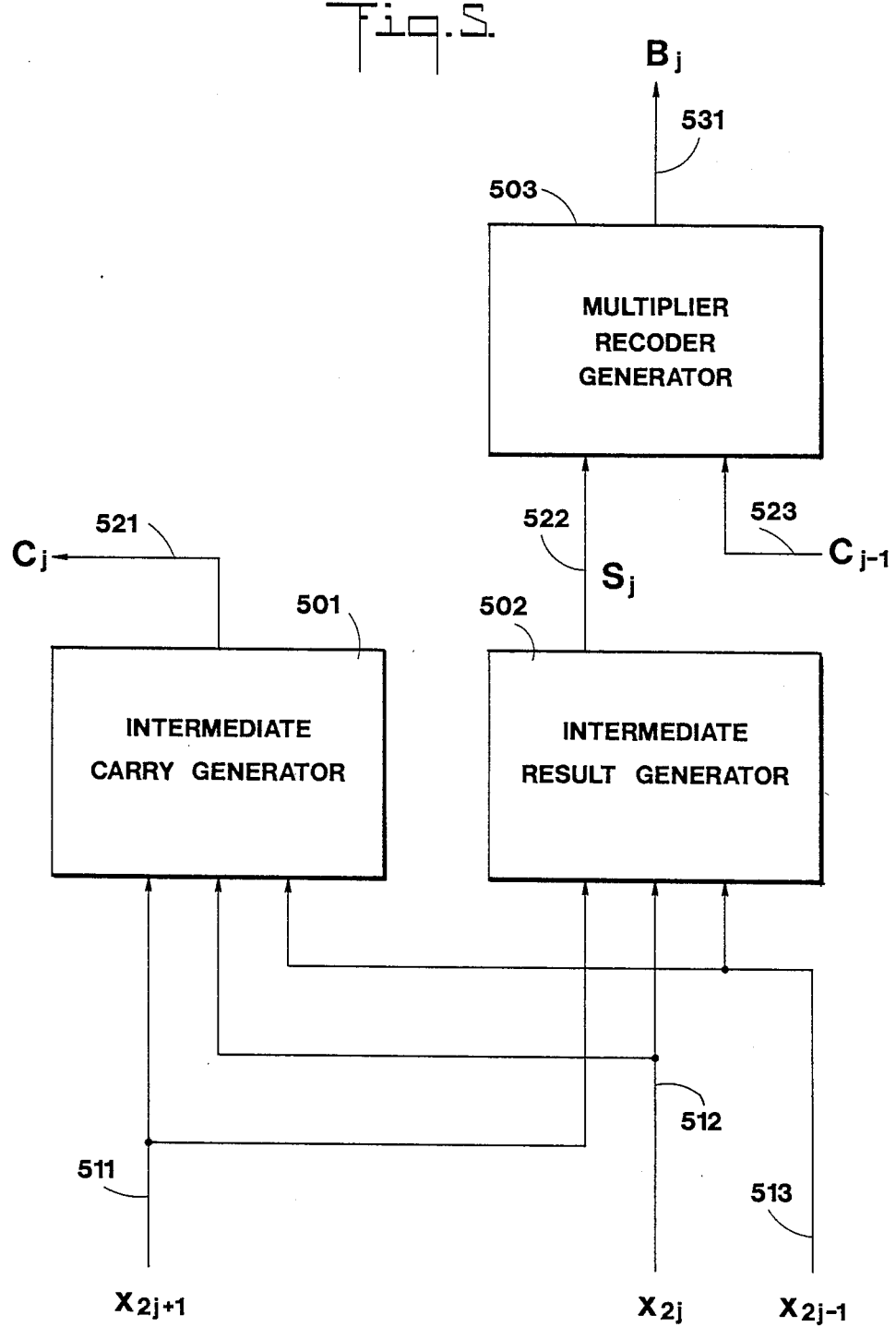
FIG. 5 is a block diagram of a second embodiment of a multiplier in accordance with this invention.

FIG. 5 illustrates another embodiment of the invention using a multiplier and redundant binary numerals for internal addition and subtraction. The multiplier of FIG. 5 includes a multiplier recoder circuit 100, a partial product generator 110, a tree structure of redundant adders 120, and a redundant binary-binary converter 130, in which at least the multiplier is a redundant binary numeral.

The multiplier recoder circuit 100 is a circuit for dividing a multiplier which is a redundant binary numeral into groups of 2 digits each (which correspond to groups of three digits wherein the least significant digit of each 3-digit group is the same as the most significant digit of the next lower order 3-digit group), and recoding the multiplier of each group into a radix 4 signed digit number. Therefore, each digit of the recoded multiplier output of multiplier 100 is any one of $-2$, $-1$, 0, 1, 2. Since a binary number may be regarded as a special redundant binary number, this circuit may be used if the multiplier is a binary number.

The partial product generator 110 is a circuit for doubling the multiplicand and inverting the plus and minus signs, depending on the value of the digits of the recoded multiplier, in each digit of the multiplier recoded by the multiplier recoder circuit 100. Doubling of the multiplicand can be effected by shifting each digit of the multiplicand one position to the left. The plus and minus signs can be inverted by inverting the signs in each digit of the multiplicand. That is, when a digit of the multiplicand is 1, that digit is changed to $-1$, and when it is $-1$, it is changed to 1. When the multiplicand is a binary number expressed in 2's complement, the plus and minus signs can be inverted by taking the 2's complement. Hence, partial product generator 110 can be realized by conventional circuitry.

The redundant binary-binary converter 130 is a circuit for converting a redundant binary number obtained as a product into a binary number, and it too may be realized by conventional carry look ahead adder or the like.

Figure 6:
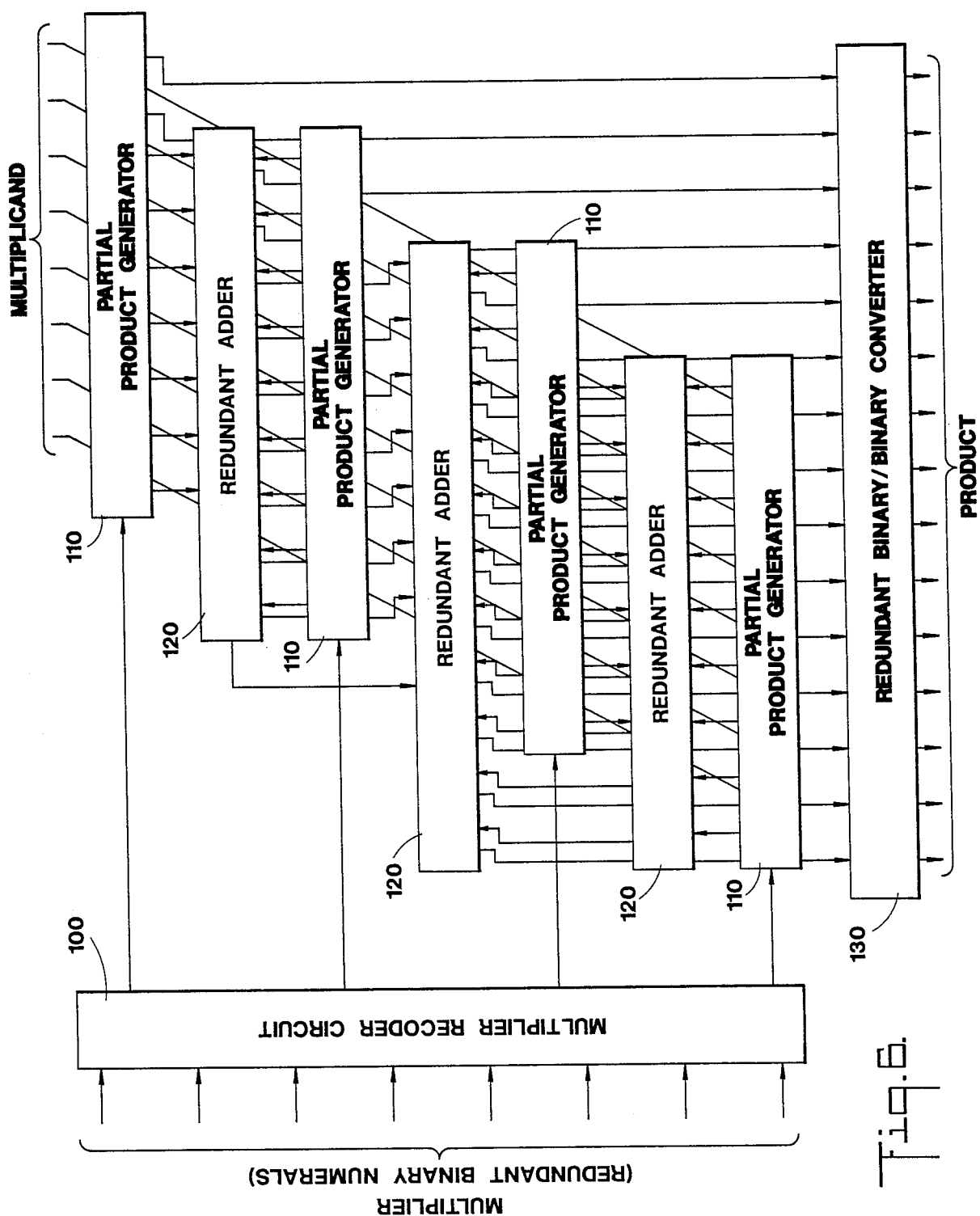
FIG. 6 is a block diagram of the multiplier recoding circuit of FIG. 5.

The multiplier recoder circuit 100 is further described by reference to FIG. 6 which shows that multiplier recoder circuit 100 includes intermediate carry generator 501, intermediate result generator 502, and a recoded multiplier generator 503. The intermediate carry generator 501 and intermediate result generator 502 both receive the $(2j+1)$-th order position $x_{2j+1}$, 511, the 2j-th order position $x_{2j}$, 512, and the $(2j-1)$-th order position $x_{2j-1}$, 513 of the multiplier, and deliver the intermediate carry $C_j$, 521 and intermediate result $S_j$, 522 at the j-th order position, respectively. The recoded multiplier generator 503 receives the intermediate result $S_j$, 522 at the j-th order position and the intermediate carry $C_{j-1}$, 523 from the (j-1)-th order position, and delivers the j-th digit $B_j$, 531 of the recoded multiplier. Thus, the multiplier is recoded in two steps. In the first step, the multiplier (a redundant binary number) is divided into groups of two digits each (which correspond to groups of three digits wherein the least significant digit of each 3-digit group is the same as the most significant digit of the next lower 3-digit order group), and the intermediate carry $C_j$, 521, and intermediate result $S_j$, 522, are determined from the two digits of the group, $x_{2j+1}$, 511, $x_{2j}$ 512, and the upper digit $x_{2j-1}$, 513 of the next lower group. In the second step, from the intermediate result $S_j$, 522, of that group and the intermediate carry $C_{j-1}$, 523, from the next lower group, the j-th digit $B_j$, 531, of the recoded multiplier is determined. The $(2j+1)$-th digit $x_{2j+1}$, 511, the 2j-th digit $x_{2j}$, 512, and the $(2j-1)$-th digit $x_{2j-1}$, 513 of the multiplier are signals expressed as any one $-1$, 0, 1, and the intermediate carry $C_j$, 521, of the j-th order position and the intermediate carry $C_{j-1}$, 523, from the (j-1)-th order position are also signals expressed as any one of $-1$, 0, 1. However, the intermediate result $S_j$, 522, of the j-th order position and the j-th digit $B_j$, 531, of the recoded multiplier are signals expressed as any one of $-2$, $-1$, 0, 1, 2. Each block will now be described in greater detail.

Intermediate carry generator 501 is a circuit for: (i) determining the intermediate carry $C_j$, 521, from the 2j-th digit $x_{2j}$, 512, and the $(2j+1)$-th digit $x_{2j+1}$, 511 of the multiplier, according to the rules shown in FIG. 7, when the $(2j-1)$-th digit $x_{2j-1}$, 513 of the multiplier is $-1$; or (ii) determining the intermediate carry $C_j$, 521, from the 2j-th digit $x_{2j}$, 512, and the $(2j+1)$-th digit $x_{2j+1}$, 511 of the multiplier, according to the rules shown in FIG. 8, when the $(2j-1)$-th digit $x_{2j-1}$, 513, of the multiplier is either 0 or 1.

For example, signed digit numerals $x_i$ and $C_j$ are binary-coded as follows. One digit $x_i$ of a multiplier is expressed in a 2-bit binary signal $x_{i+}x_{i-}$ as shown in Table 1,

TABLE 1

| $x_i$ | $x_{i+}$ | $x_{i-}$ |
|---|---|---|
| $-1$ | 0 | 1 |
| 0 | 0 | 0 |
| 1 | 1 | 0 | the intermediate carry $C_j$ is similarly expressed in a 2-bit binary signal $C_{j+}C_{j-}$ as in Table 1. The intermediate carry generator 501 may be conventionally designed as $$C_j{}^+ = x_{2j+1+} \bullet x_{2j++} + x_{2j+1+} \bullet \overline{x_{2j-}} \bullet \overline{x_{2j-1-}},$$

$$C_j{}^- = x_{2j+1-} \bullet x_{2j-} + x_{2j+1-} \bullet x_{2j+} \bullet x_{2j-1-}.$$

The intermediate result generator 502 is a circuit for: (i) determining the intermediate result $S_j$, 522, from the $(2j+1)$-th digit $x_{2j+1}$, 511, and the 2j-th digit $x_{2j}$, 512, according to the rules shown in FIG. 9, when the $(2j-1)$-th digit $x_{2j-1}$, 513 of the multiplier is $-1$; or (ii) determining the intermediate result $S_j$, 522 from the $(2j+1)$-th digit $x_{2j+1}$, 511, and the 2j-th digit $x_{2j}$, 512 of the multiplier, according to the rules shown in FIG. 10, when the $(2j-1)$-th digit $xx_{2j-1}$, 513 of the multiplier is either 0 or 1.

For example, when the digit $x_i$ of the multiplier is expressed in a 2-bit binary signal $x_{i+}x_{i-}$ as shown in Table 1 and the intermediate result $S_j$ is a 3-bit binary signal $S_{j-}S_{j2}S_{j1}$ as shown in Table 2 below, the intermediate result generator 502 may be conventionally designed as follows:

$$S_{j-} = (x_{2j+1+} + x_{2j+1-}) \cdot (\overline{x_{2j+}} + x_{2j-} \cdot \overline{x_{2j-1-}}) + (\overline{x_{2j+1+} + x_{2j+1-}}) \cdot x_{2j-}$$

$$S_{j2} = (x_{2j+1+} + x_{2j+1-}) \cdot (\overline{x_{2j+} + x_{2j-}})$$

$$S_{j1} = x_{2j+} + x_{2j-}.$$

TABLE 2

| $S_j$ | $S_{j-}$ | $S_{j2}$ | $S_{j1}$ |
|---|---|---|---|
| −2 | 1 | 1 | 0 |
| −1 | 1 | 0 | 1 |
| 0 | 0 | 0 | 0 |
| 1 | 0 | 0 | 1 |
| 2 | 0 | 1 | 0 |

On the other hand, the recoded multiplier generator 503 is a circuit for generating the j-th digit of the recoded multiplier, by adding up the j-th order position intermediate result $S_j$, 522 and the intermediate carry $C_{j-1}$, 523, from the next lower order position, that is, the (j−1)-th order position, or by performing the arithmetic sum, $S_j + C_{j-1}$.

For example, when the intermediate carry $C_j$ and intermediate result $S_j$ are binary-coded as shown above and the digit $B_j$ of the recoded multiplier is expressed as a 3-bit binary signal $B_{j-}B_{j2}B_{j1}$, the same as the intermediate result $S_j$, as in Table 2, the recoded multiplier generator 503 may be conventionally designed as follows:

$$B_{j-} = S_{j-} \cdot (\overline{S_{j1} \cdot C_{j-1+}}) + \overline{S}_{j2} \cdot \overline{S}_{j1} \cdot C_{j-1-},$$

$$B_{j2} = S_{j2} \cdot \overline{C}_{j-1+} \cdot \overline{C}_{j-1-} + S_{j-} \cdot C_{j-1-} + \overline{S}_{j-} \cdot S_{j1} \cdot C_{j-1+},$$

$$B_{j1} = S_{j1} \oplus (C_{j-1+} + C_{j-1-})$$

where • denotes AND, ⊕ means OR, ⊕ stands for EX-OR, and − is an operator expressing logical negation.

In this embodiment, the multiplier is divided into two grouped of two digits each (which correspond to groups of three digits wherein the least significant digit of each 3-digit group is the same as the most significant digit of the next lower order 3-digit group), that is, the (2j+1)-th digit, $x_{2j+1}$, and the 2j-th digit, $x_{2j}$, but it is also possible to divide this into groups consisting of two digits, that is, the 2j-th digit, $x_{2j}$, and the (2j−1)th digit, $x_{2j-1}$. The multiplier recoder circuit 100 has the fundamental circuit shown in FIG. 6 for each of such groups.

Finally, the redundant adder 120 is explained below. The addition rule for the redundant adder 120 is shown in Table 3.

TABLE 3

| Type | Augend ($X_i$) | Addend ($y_i$) | Next lower order position ($x_{i-1}, y_{i-1}$) | Carry ($C_i$) | Intermediate sum ($S_i$) |
|---|---|---|---|---|---|
| <1> | 1 | 1 | — | 1 | 0 |
| <2> | 1 | 0 | Both are nonnegative | 1 | −1 |
|  | 0 | 1 | At least one is negative | 0 | 1 |
| <3> | 0 | 0 | — | 0 | 0 |
| <4> | 1 | −1 |  |  |  |
|  | −1 | 1 |  |  |  |
| <5> | 0 | −1 | Both are nonnegative | 0 | −1 |
|  | −1 | 0 | At least one is negative | −1 | 1 |
| <6> | −1 | −1 | — | −1 | 0 |

The addition at the i-th order position is determined by the following logical expressions:

$$x_{id} = x_{i+} + x_{i-},$$
$$y_{id} = y_{i+} + y_{i-},$$
$$p_i = \overline{x}_{i-} \cdot \overline{y}_{i-},$$
$$u_i = x_{id} \cdot \overline{y}_{id} \cdot p_{i-1} + \overline{x}_{id} \cdot y_{id} \cdot p_{i-1} + x_{i+} \cdot y_{id} + x_{id} \cdot y_{i+},$$
$$t_i = x_{id} \cdot \overline{y}_{id} \cdot p_{i-1} + \overline{x}_{id} \cdot y_{id} \cdot p_{i-1} +$$
$$\quad x_{id} \cdot y_{id} \cdot \overline{p_{i-1}} + \overline{x}_{id} \cdot \overline{y}_{id} \cdot \overline{p_{i-1}},$$
$$z_{i+} = \overline{t}_i \cdot \overline{u_{i-1}},$$
$$z_{i-} = t_i \cdot u_{i-1}.$$

Figure 11:
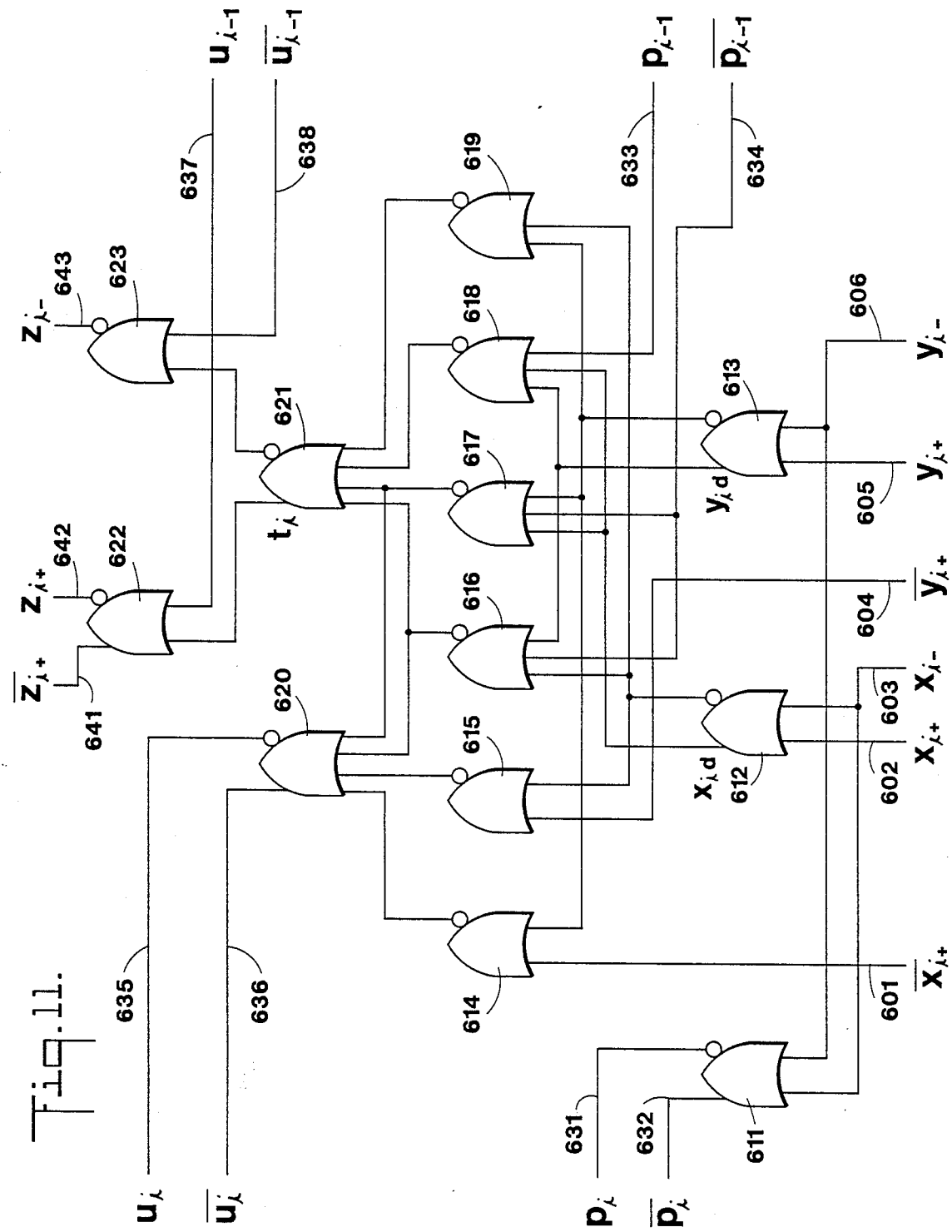
FIG. 11 is a circuit diagram showing a cell for addition in a redundant adder.

FIG. 11 is a schematic circuit diagram showing an adder cell for implementing the redundant adder 120. This is an example of realizing an adder cell by NOR-/OR logic.

Gates 611 through 623 are NOR/OR circuits, in which signals $X_{i+}$, 602, and $X_{i-}$, 603, are 2-bit signals expressing the i-th digit, $x_i$, of redundant binary number of augend, $\overline{x_{i+}}$ 601 is a signal to express the logical negation of $x_{1+}$, 602, $Y_{i+}$, 605 and $Y_{i-}$, 606 are 2-bit signals expressing the i-th order position $Y_i$ or redundant binary numeral of addend, and $\overline{Y}_{i+}$, 604, is a signal to express the logical negation of $Y_{i+}$, 605. Signal $P_i$, 631, is a signal which establishes whether both augend $x_i$ and addend $Y_i$ at the i-th order position are nonnegative or not, and $P_{i-1}$, 633, is a signal which establishes whether both augend $x_{i-1}$ and addend $Y_{i-1}$ at the (i−1)-th order position are nonnegative or not. Signals $\overline{P_i}$, 632, $\overline{P_{i-1}}$, 634, express the logical negation of $P_i$, 631 and $P_{i-1}$, 633, respectively. Furthermore, $u_i$, 635 and $\overline{u}_i$, 636 are respectively the signal relating to the intermediate carry at the i-th order position and the signal to express its logical negation; $u_{i-1}$, 637 and $\overline{u_{i-1}}$, 638 are individually the signal relating to the intermediate carry from the (i−1)-th order position and the signal to express its logical negation; $z_{i+}$, 642 and $z_{i-}$, 643 are 2-bit signals expressing the i-th order position $z_i$ of the result of addition, and $\overline{z_{i+}}$, 641 is a signal to express the logical negation of $z_{i+}$, 642.

While the circuit of FIG. 11 is implemented in NOR-/OR logic bearing ECL circuit in mind, it is possible to implement this circuit by employing other technologies (e.g., CMOS, NMOS, TTL, IIL) or higher-radix logic.

In this embodiment, as compared with the conventional multiplier having redundant binary number as its multiplier, the number of partial products is reduced to about half.

In this invention, since the output result of arithmetic operation of arithmetic processor can be directly fed into the operation of the next stage, and it is not necessary to convert the arithmetic operation results from the internal expression to an external expression such as binary expression, repeated operations of multiplication, or consecutive operations of addition and subtraction or multiplication can be executed at high speed.

While the invention has been explained by reference to specific examples, it is understood that modifications can be made thereto which would come within the spirit and scope of the invention set forth in the appended claims.

What is claimed is:

1. An arithmetic processor capable of performing successive multiplication operations on a multiplicand and a multiplier by generating a plurality of partial products and calculating sums thereof to obtain a final product, each digit of said final product being represented as a carry-save expression by a carry digit and a sum digit, wherein said final product may be input as a multiplier for the next successive multiplication operation, said arithmetic processor comprising:
  (a) a multiplier recoder means which receives an N digit multiplier represented as a carry-save expression having N-bit signals representing the carry digits of said multiplier and N-bit signals representing the sum digits of said multiplier, said multiplier recoder means determining therefrom and provided as an output a recoded radix 4 multiplier of M digits where M=N/2;
  (b) a plurality of partial product generating means each of which receives said multiplicand and a digit of said recoded radix 4 multiplier and determines therefrom one of said plurality of partial products;
  (c) a summation means to which is input said plurality of partial products, said summation means determining therefrom and supplying as an output said final product represented as a carry-save expression;
  (d) a converter means for converting said final product represented by a carry-save expression into an ordinary binary number; and
  (e) a plurality of memory means which store and provide as an output said carry digits and said sum digits representing said final product determined by said summation means for use as a multiplier in the next successive multiplication operation.

2. An arithmetic processor according to claim 1 wherein said summation means comprises a plurality of carry-save adders each of which receives three input signals representing said partial products to be added therein and a signal representing an output from the carry-save adder which performs the next lower order operation, and which determines therefrom and provides as an output two signals representing said carry digits and sum digits which form said carry-save expression.

3. An arithmetic processor according to claim 1 which further includes two or more multiplexer for selecting whether said final product determined by said summation means or another number represented as a carry-save expression is input to said multiplier recoder means for use as a multiplier in the next successive multiplication operation.

4. An arithmetic processor capable of performing successive multiplication operations on a multiplicand and a multiplier by generating a plurality of partial products and calculating sums thereof to obtain a final product, each digit of said final product being represented as a carry-save expression by a carry digit and a sum digit, wherein said final product may be input as a multiplier for the next successive multiplication operation, said arithmetic processor comprising:
  (a) a multiplier recoder means which receives an N digit multiplier represented as a carry-save expression having N-bit signals representing the carry digits of said multiplier and N-bit signals representing the sum digits of said multiplier, said multiplier recoder means determining therefrom and provided as an output a recoded radix 4 multiplier of M digits where M=N/2;
  (b) a plurality of partial product generating means each of which receives said multiplicand and a digit of said recoded radix 4 multiplier and determines therefrom one of said plurality of partial products;
  (c) a summation means to which is input said plurality of partial products, said summation means determining therefrom and supplying as an output said final product represented as a carry-save expression;
  (d) an addition/subtraction means to which are input said final product represented as a carry-save expression and a binary number, said addition/subtraction means determining therefrom a sum or difference which is output as a carry-save expression having carry digits and sum digits;
  (e) a converter means for converting said sum or difference represented as a carry-save expression into an ordinary binary number; and
  (f) a plurality of memory means which store and provide as an output said carry digits and said sum digits representing said sum or difference determined by said addition/subtraction means for use as a multiplier in the next successive multiplication operation.

5. An arithmetic processor according to claim 4 wherein said addition/subtraction means comprises a plurality of carry-save adders each of which receives three input signals representing said final product and said binary number to be added or subtracted therein, and which determines therefrom and provides as an output two signals representing said sum or difference as a carry-save expression.

6. A method for recoding a radix 2 N-digit multiplier represented as a carry-save expression by N carry digits and N sum digits into a radix 4 signed-digit number of M digits, each digit of which is denoted by an order index j which assumes integer values ranging from 1 to M, where M=N/2 comprising the steps of:
  (a) dividing said N carry digits into a first group or ordered sets denoted by said order index j, each set of said first group having three digits wherein the least significant digit of the j-th set is the same as the most significant digit of the (j−1)th set;
  (b) dividing said N sum digits into a second group of ordered sets denoted by said order index j, each set of said second group having three digits wherein the least significant digit of the j-th set is the same as the most significant digit of the (j−1)th set;

(c) supplying for each value of said order index j, the j-th set of three digits from said first group and the corresponding j-th set of three digits from said second group to an intermediate carry generating means, said intermediate carry generating means determining therefrom the j-th intermediate carry digit of said radix 4 signed-digit number by calculating the value of three sums obtained by adding each digit from the j-th set of the first group to the corresponding digit of the j-th set of the second group;

(d) supplying for each value of said order index j, the j-th set of three digits from said first group and the corresponding j-th set of three digits from said second group to an intermediate result generating means, said intermediate result generating means determining therefrom the j-th intermediate sum digit of said radix 4 signed-digit number by calculating the value of three sums obtained by adding each digit from the j-th set of the first group to the corresponding digit of the j-th set second group; and (e) supplying for each value of said order index j, the j-th intermediate sum digit of said radix 4 signed-digit number and the (j−1)-th intermediate carry digit of said radix 4 signed-digit number to a recoded multiplier generating means, said recoded multiplier generating means determing from the sum thereof the j-th digit of the multiplier recoded into a radix 4 signed-digit number.

7. An arithmetic processor capable of performing successive multiplication operation on a multiplicand and a multiplier by generating a plurality of partial products expressed as binary signed-digit numbers and calculating sums thereof to obtain a final product expressed as a binary signed-digit number, wherein said final product may be input as a multiplier for the next successive multiplication operation, said arithmetic processor comprising:

(a) a multiplier recorder means which receives 2N bit signals representing an N bit multiplier expressed as a binary signed-digit number, said multiplier recoder means determining therefrom and provided as an output a recoded radix 4 multiplier of M digits where M=N/2;

(b) a plurality of partial product generating means each of which receives said multiplicand and a digit of said recoded radix 4 multiplier and determines therefrom one of said plurality of partial products;

(c) a summation means to which is input said plurality of partial products, said summation means determining therefrom and supplying as an output said final product expressed as a signed-digit number;

(d) a converter means for converting said final product expressed as a signed-digit number into an ordinary binary number; and (e) a plurality of memory means which store and provide as an output said binary signed-digit number representing said final product determined by said summation means for use as a multiplier in the next successive multiplication operation.

8. An arithmetic processor according to claim 7 wherein said summation means comprises a plurality of signed-digit adders each of which receives input signals representing said partial products to be added therein, and which determines therefrom and provides output signals representing said digits of the final product as a binary signed-digit expression.

9. An arithmetic processor according to claim 7 which further includes two or more multiplexers for selecting whether said final product determined by said summation means or another number is input to said multiplier recorder means for use as a multiplier in the next successive multiplication operation.

10. An arithmetic processor capable of performing successive multiplication operations on a multiplicand and a multiplier by generating a plurality of partial products expressed as binary signed-digit numbers and calculating sums thereof to obtain a final product expressed as a signed-digit number, wherein said final product may be input as a multiplier for the next successive multiplication operation, said arithmetic processor comprising:

(a) a multiplier recoder means which receives 2N bit signals representing an n bit multiplier expressed as a signed-digit number, said multiplier recorder means determining therefrom and provided as an output a recoded radix 4 multiplier of M digits where M=N/2;

(b) a plurality of partial product generating means each of which receives said multiplicand and a digit of said recoded radix 4 multiplier and determines therefrom one of said plurality of partial products;

(c) a summation means to which is input said plurality of partial products, said summation means determining therefrom and supplying as an output said final product expressed as a signed-digit number;

(d) an addition-subtraction means to which are input said final product expressed as a signed-digit number and another binary signed-digit number, said addition/subtraction means determining therefrom a sum or difference which is output as a binary signed-digit number;

(e) a converter means for converting said sum or difference represented by a signed-digit number into an ordinary binary number; and (f) a plurality of memory means which store and provide as an output said signed-digit number representing said sum or difference determined by said addition/subtraction means for use as a multiplier in the next successive multiplication operation.

11. An arithmetic processor according to claim 10 wherein said addition/subtraction means comprises a plurality of signed-digit adders each of which receives input signals representing the digits said final product and said binary signed-digit number to be added or subtracted therein, and which determines therefrom and provides output signals representing said sum or difference as a signed-digit number.

12. A method for recoding a radix 2 N-digit multiplier represented as a binary signed digit expression having 2N bits into a radix 4 signed-digit number of M digits, each digit of which is denoted by an order index j which assumes integer values ranging from 1 to M, where M=N/2 comprising the steps of:

(a) dividing said N binary signed-digits into ordered sets denoted by said order index j, each set having three digits wherein the least significant digits of the j-th set is the same as the most significant digit of the (j−1)-th set;

(b) supplying for each value of said order index j, the j-th set of three digits to an intermediate carry generating means, said intermediate carry generating means determining therefrom the j-th intermediate carry digit of said radix 4 signed-digit number in accordance with the values of the three digits of said j-th set;

(c) supplying for each value of said order index j, the j-th set of three digits to an intermediate result generating means, said intermediate result generating means determining therefrom the j-th intermediate sum digit of said radix 4 signed-digit number in accordance with the values of the 3 digits from the group; and (e) supplying for each value of said order index j, the j-th intermediate sum digit of said radix 4 signed-digit number and the (j−1)-th intermediate carry digit of said signed-digit number to a recoded multiplier generating means, said recoded multiplier generating means determining from the sum thereof the j-th digit of the multiplier recoded into a radix 4 signed-digit number.

* * * * *

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, Shigeo Kuninobu, and Naofumi Takagi

It is certified that error appears in the above-identified patent and that said Letters Patent is hereby corrected as shown below:

Col. 1, line 14    "074,97I" should be "074,971"

Col. 5, line 21    "$Y_{2J+}1$" should be "$Y_{2J+1}$"

line 21    "$Y_{2J+1}$" should be "$y_{2J+1}$"

line 21    "$Y_{2J}$" should be "$y_{2J}$"

line 22    "$Y_{2J-1}$" should be "$y_{2J-1}$"

line 43    "$Y_{2J+1}$" should be "$y_{2J+1}$"

line 43    "$Y_{2J}$" should be "$y_{2J}$"

line 45    "$Y_{2J-1}$" should be "$y_{2J-1}$"

line 51    "$Y_{2J+1}$" should be "$y_{2J+1}$"

line 51    "$Y_{2J}$" should be "$y_{2J}$"

line 51    "$Y_{2J-1}$" should be "$y_{2J-1}$"

line 65    "$Y_{2J+1}$" should be "$y_{2J+1}$"

line 65    "$Y_{2J}$" should be "$y_{2J}$"

line 67    "$Y_{2J-1}$" should be "$y_{2J-1}$"

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, Shigeo Kuninobu, and Naofumi Takagi

Page 2 of 6

It is certified that error appears in the above-identified patent and that said Letters Patent is hereby corrected as shown below:

Col. 8, line 4  "any one" should be "any one of"

line 52  "$xx_{2j-1}$" should be "$x_{2j-1}$"

line 63  "$\overline{x}_{2j+} + x_{2j-} \cdot \overline{x}_{2j-1-}$" should be "$x_{2j+} + \overline{x}_{2j-} \cdot \overline{x}_{2j-1-}$"

Col. 9, line 29  "$S_{j,1}$" should be "$\overline{S}_{j,1}$"

line 30  "$\oplus$ means" should be "+ means"

line 34  "grouped" should be "groups"

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, Shigeo Kuninobu, and Naofumi Takagi

It is certified that error appears in the above-identified patent and that said Letters Patent is hereby corrected as shown below:

Col. 10, line 47, Table 3

| Type | Augend ($X_i$) | Addend ($y_i$) | Next lower order position ($x_{i-1}, y_{i-1}$) | Carry ($C_i$) | Intermediate sum ($S_i$) |
|---|---|---|---|---|---|
| <1> | 1 | 1 | — | 1 | 0 |
| <2> | 1 | 0 | Both are nonnegative | 1 | −1 |
|     | 0 | 1 | At least one is negative | 0 | 1 |
| <3> | 0 | 0 | — | 0 | 0 |
| <4> | 1 | −1 |  |  |  |
|     | −1 | 1 |  |  |  |
| <5> | 0 | −1 | Both are nonnegative | 0 | −1 |
|     | −1 | 0 | At least one is negative | −1 | 1 |
| <6> | −1 | −1 | — | −1 | 0 | should be

| Type | Augend ($X_i$) | Addend ($y_i$) | Next lower order position ($x_{i-1}, y_{i-1}$) | Carry ($C_i$) | Intermediate sum ($S_i$) |
|---|---|---|---|---|---|
| <1> | 1 | 1 | — | 1 | 0 |
| <2> | 1 | 0 | Both are nonnegative | 1 | −1 |
|     | 0 | 1 | At least one is negative | 0 | 1 |
| <3> | 0 | 0 | — | 0 | 0 |
| <4> | 1 | −1 |  | 0 | 0 |
|     | −1 | 1 |  |  |  |
| <5> | 0 | −1 | Both are nonnegative | 0 | −1 |
|     | −1 | 0 | At least one is negative | −1 | 1 |
| <6> | −1 | −1 | — | −1 | 0 |

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, et al.

It is certified that error appears in the above-identified patent and that said Letters Patent is hereby corrected as shown below:

Col. 10, line 4    "$x_{id} \cdot \overline{y}_{id} \cdot p_{i-1} + \overline{x}_{id} \cdot y_{id} \cdot p_{i-1} + x_{i+} \cdot y_{id} + x_{id} \cdot y_{i+}$" should be "$x_{id} \cdot \overline{y}_{id} \cdot p_{i-1} + \overline{x}_{id} \cdot y_{id} \cdot p_{i-1} + x_{i+} \cdot y_{id} + x_{id} \cdot y_{i+}$"

line 19    "$X_{i+}$" should be "$x_{i+}$"

line 19    "$X_{i-}$" should be "$x_{i-}$"

line 22    "$x_{i+}$" should be "$x_{i+1}$"

line 22    "$Y_{i+}$" should be "$y_{i+}$"

line 22    "$Y_{i-}$" should be "$y_{i-}$"

line 23    "$Y_i$" should be "$y_i$"

line 24    "$\overline{Y}_{i+}$" should be "$\overline{y}_{i+}$"

line 25    "$Y_{i+}$" should be "$y_{i+}$"

line 25    "$P_i$" should be "$p_i$"

line 27    "$Y_i$" should be "$y_i$"

line 28    "$P_{i-1}$" should be "$p_{i-1}$"

line 30    "$Y_{i-1}$" should be "$y_{i-1}$"

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, Shigeo Kuninobu, and Naofumi Takagi

It is certified that error appears in the above-identified patent and that said Letters Patent is hereby corrected as shown below:

Col. 10, line 32  "$\overline{P}_i$" should be "$\overline{p}_i$"

line 32  "$\overline{P}_{i-1}$" should be "$\overline{p}_{i-1}$"

line 32  "$P_i$" should be "$p_i$"

line 33  "$P_{i-1}$" should be "$p_{i-1}$"

Col. 11, line 60  "multiplexer" should be "multiplexers"

Col. 13, line 31  "operation" should be "operations"

line 40  "recorder" should be "recoder"

UNITED STATES PATENT AND TRADEMARK OFFICE
CERTIFICATE OF CORRECTION

PATENT NO. : 4,868,777

DATED : September 19, 1989

INVENTOR(S) : Tomatsu Nishiyama, Shigeo Kuninobu, and Naofumi Takagi

It is certified that error appears in the above-identified patent and that said Letters Patent is hereby corrected as shown below:

Col. 14, line 8     "recorder" should be "recoder"

line 21     "n" should be "N"

line 22     "recorder" should be "recoder"

line 35     "addition-subtraction" should be "addition/subtraction"

line 60     "signed digit" should be "signed-digit"

line 68     "digits" should be "digit"

Signed and Sealed this

Eighteenth Day of August, 1992

Attest:

DOUGLAS B. COMER

Attesting Officer     Acting Commissioner of Patents and Trademarks